(12) United States Patent
Ishizu et al.

(10) Patent No.: US 10,239,172 B2
(45) Date of Patent: Mar. 26, 2019

(54) GEAR MANUFACTURING MACHINE

(71) Applicant: MITSUBISHI HEAVY INDUSTRIES MACHINE TOOL CO., LTD., Ritto-shi, Shiga (JP)

(72) Inventors: Kazuyuki Ishizu, Tokyo (JP); Noritaka Fujimura, Tokyo (JP); Yoko Hirono, Tokyo (JP); Tatsuro Takagi, Tokyo (JP)

(73) Assignee: Mitsubishi Heavy Industries Machine Tool Co., Ltd., Ritto-shi, Shiga (JP)

(*) Notice: Subject to any disclaimer, the term of this patent is extended or adjusted under 35 U.S.C. 154(b) by 127 days.

(21) Appl. No.: 15/500,797

(22) PCT Filed: Jul. 31, 2015

(86) PCT No.: PCT/JP2015/071741
§ 371 (c)(1),
(2) Date: Jan. 31, 2017

(87) PCT Pub. No.: WO2016/031487
PCT Pub. Date: Mar. 3, 2016

(65) Prior Publication Data
US 2017/0232564 A1   Aug. 17, 2017

(30) Foreign Application Priority Data
Aug. 27, 2014   (JP) ................... 2014-172364

(51) Int. Cl.
*B23Q 3/157*   (2006.01)
*B23Q 11/08*   (2006.01)
(Continued)

(52) U.S. Cl.
CPC .......... *B23Q 3/1554* (2013.01); *B23Q 3/157* (2013.01); *B23Q 3/15533* (2013.01);
(Continued)

(58) Field of Classification Search
CPC ......................... B23Q 3/155–3/15793; Y10T 409/10–409/109699
(Continued)

(56) References Cited

U.S. PATENT DOCUMENTS 4,190,947 A      3/1980  Sato et al.
4,359,815 A  *  11/1982  Toyoda .............. B23Q 3/15713
                                                414/225.01
(Continued)

FOREIGN PATENT DOCUMENTS

CN     101698282 A    4/2010
CN     202943462 U    5/2013
(Continued)

OTHER PUBLICATIONS

Machine Translation of JP 57-089540-A, which JP '540 was published Jun. 1982.*
(Continued)

*Primary Examiner* — Erica E Cadugan
(74) *Attorney, Agent, or Firm* — Birch, Stewart, Kolasch & Birch, LLP (57) ABSTRACT

A gear manufacturing machine for which a machining tool detachably attached to a tool spindle is exchanged by means of an automatic tool changer, wherein the automatic tool changer is provided with: tool holding means for detachably holding a machining tool to be exchanged; moving means for moving the tool holding means in a direction parallel to the axial direction of the tool spindle; and rotating means for rotating the tool holding means.

7 Claims, 8 Drawing Sheets

(51) Int. Cl.
*B23Q 11/00* (2006.01)
*B23Q 17/00* (2006.01)
*B23F 5/22* (2006.01)
*B23F 23/12* (2006.01)
*B23Q 3/155* (2006.01)

(52) U.S. Cl.
CPC ............ *B23Q 11/0891* (2013.01); *B23F 5/22* (2013.01); *B23F 23/12* (2013.01); *B23Q 11/0085* (2013.01); *B23Q 17/006* (2013.01); *B23Q 2003/155411* (2016.11); *Y10T 409/10159* (2015.01); *Y10T 483/115* (2015.01); *Y10T 483/1705* (2015.01); *Y10T 483/1736* (2015.01); *Y10T 483/1873* (2015.01)

(58) Field of Classification Search
USPC ....................................... 409/1–62
See application file for complete search history.

(56) References Cited

U.S. PATENT DOCUMENTS

| | | | |
|---|---|---|---|
| 4,419,807 A | 12/1983 | Moulin | |
| 4,590,661 A | 5/1986 | Lunazzi | |
| 4,599,786 A * | 7/1986 | Uhtenwoldt | B23Q 7/046 483/14 |
| 5,205,806 A | 4/1993 | Ishida et al. | |
| 5,213,559 A * | 5/1993 | Lunazzi | B23F 23/04 409/7 |
| 6,514,183 B2 * | 2/2003 | Hoppe | B23Q 3/1552 409/230 |
| 9,333,607 B2 | 5/2016 | Suzuki et al. | |
| 2013/0225379 A1 * | 8/2013 | Kato | B23Q 3/157 483/1 |
| 2014/0080689 A1 | 3/2014 | Suzuki et al. | |
| 2018/0178301 A1 * | 6/2018 | Toyama | B23F 1/06 |

FOREIGN PATENT DOCUMENTS

| | | | |
|---|---|---|---|
| CN | 103547411 A | | 1/2014 |
| CN | 203726256 U | | 7/2014 |
| JP | 57-089540 A | * | 6/1982 |
| JP | 59-129618 A | | 7/1984 |
| JP | 62-255012 A | * | 11/1987 |
| JP | 63-7413 U | | 1/1988 |
| JP | 4-269137 A | | 9/1992 |
| JP | 2000-296434 A | | 10/2000 |
| JP | 2014-97552 A | | 5/2014 |
| WO | WO 2012/157126 A1 | | 11/2012 |

OTHER PUBLICATIONS

Chinese Office Action dated Feb. 14, 2018 in corresponding Chinese Application No. 201580041081.2.
International Preliminary Report on Patentability and English translation of the Written Opinion of the International Searching Authority (Forms PCT/IB/338, PCT/IB/373 and PCT/ISA/237) for International Application No. PCT/JP2015/071741, dated Mar. 9, 2017.
International Search Report and Written Opinion of the International Searching Authority (Forms PCT/ISA/210, PCT/ISA/220 and PCT/ISA/237) for International Application No. PCT/JP2015/071741, dated Oct. 20, 2015, with an English translation of the International Search Report.
Chinese Office Action dated Oct. 29, 2018 issued in corresponding Chinese Application No. 201580041081.2.

* cited by examiner

Open/closed State Detecting Sensors for Detecting Whether Shutters 101, 102, and 103 Are Open or Closed

FIG. 11

GEAR MANUFACTURING MACHINE

TECHNICAL FIELD

The present invention relates to a gear manufacturing machine including an automatic tool changer.

BACKGROUND ART

In gear manufacturing machines, a worker typically exchanges a machining tool manually. However, because various devices, parts, and the like are provided in a gear manufacturing machine, the worker must take into account interference with nearby devices when exchanging the tool. Furthermore, the machining tool must be attached to the gear manufacturing machine correctly to prevent problems with cutting accuracy from arising in the gear manufacturing machine. In other words, the worker must stay safe and pay attention when exchanging the machining tool. In particular, workers unaccustomed to the process of exchanging the machining tool may slip and drop the machining tool, and thus such workers must take extra care to stay safe and pay attention when exchanging the machining tool. Furthermore, when exchanging a machining tool that has been lengthened or the like in order to extend the lifespan of the tool and is thus heavy, the worker must be strong and take greater care to stay safe, and this places a greater burden on the worker.

Thus in gear manufacturing machines, automating the exchange of the machining tool can be considered as a way to lighten the burden on the worker. A hobbing machine including a hob changer disclosed in Patent Document 1 can be given as an example of a gear manufacturing machine including an automatic tool changer capable of automatically exchanging a machining tool in this manner.

CITATION LIST

Patent Document

Patent Document 1: Japanese Unexamined Utility Model Registration Application Publication No. S63-7413

SUMMARY OF INVENTION

Technical Problem

The hob changer disclosed in Patent Document 1 uses cylinders to individually move multiple hob holders, which are arranged at intervals in a movement direction of a hob saddle, toward and away from a hob clamping device at an angle relative to the hob clamping device. However, because hob cutters are moved at an angle relative to the hob clamping device, a region in which the hob cutter interferes with nearby parts will vary depending on the axial direction length of the hob cutter. It is therefore necessary to design the structure taking into account the interference region of the longest hob cutter that can be used in the hobbing machine. There are thus strict limitations on shapes, operations, and the like due to interference, and there is a risk of the design process becoming complicated.

In light of this, moving the hob cutters toward and away from the hob clamping device on a front side or a rear side of the hobbing machine can be considered. However, space for installing a control panel and operation space for performing maintenance on the hobbing machine are necessary on the front side of the hobbing machine, whereas space for installing a chip conveyer and a cuttings box for removing cuttings (chips) of the machined item produced when gears are machined is necessary on the rear side of the hobbing machine. In other words, other operation spaces and the like are provided on the front side and rear side of the hobbing machine, and thus the automatic tool changer for moving the hob cutters cannot be provided on the front side or the rear side of the hobbing machine.

Having been achieved in light of the above-described problems, an object of the present invention is, in a gear manufacturing machine including an automatic tool changer, to reduce the size of a region of interference when moving a machining tool and make a design process easy.

Solution to Problem

A gear manufacturing machine according to a first invention for solving the above-described problems is a gear manufacturing machine comprising an automatic tool changer that exchanges a machining tool mounted on a tool spindle in a removable state. The automatic tool changer includes tool holding means for holding the machining tool in a removable state, moving means for moving the tool holding means in a direction parallel to an axial direction of the tool spindle, and rotating means for rotating the tool holding means.

A gear manufacturing machine according to a second invention for solving the above-described problems is the gear manufacturing machine according to the first invention, wherein the automatic tool changer includes raising and lowering means for raising and lowering the tool holding means in a vertical direction.

A gear manufacturing machine according to a third invention for solving the above-described problems is the gear manufacturing machine according to the first or second invention, wherein the tool holding means includes positioning means for positioning the machining tool in a circumferential direction.

A gear manufacturing machine according to a fourth invention for solving the above-described problems is the gear manufacturing machine according to any one of the first to third inventions, wherein the automatic tool changer includes tool presence detecting means for detecting whether or not the tool holding means is holding the machining tool.

A gear manufacturing machine according to a fifth invention for solving the above-described problems is the gear manufacturing machine according to any one of the first to fourth inventions, wherein the rotating means rotates the tool holding means around a vertical rotation axis.

A gear manufacturing machine according to a sixth invention for solving the above-described problems is the gear manufacturing machine according to any one of the first to fifth inventions, further comprising a column supported on a bed, a saddle supported on the column, and a tool head supported on the saddle, the column, the saddle, and the tool head being movable in three mutually-different axial directions. By driving the column, the saddle, and the tool head, the machining tool held by the tool holding means is mounted on the tool spindle with an axial direction of the machining tool held by the tool holding means and the axial direction of the tool spindle kept parallel to each other.

A gear manufacturing machine according to a seventh invention for solving the above-described problems is the gear manufacturing machine according to any one of the first to sixth inventions, further comprising: a cover member that defines a machining space where a gear is cut into the gear to be machined, a setup space for loading and unloading the machining tool in and from the tool holding means, and an outside space outside the machining space and the setup space; a first door part, provided in the cover member, that enables the machining space and the setup space to communicate; a second door part, provided in the cover member, that enables the setup space and the outside space to communicate; and open/closed state detecting means for detecting whether the first door part and the second door part are open or closed.

Advantageous Effects of Invention

According to the gear manufacturing machine of the first invention, the machining tool is moved in the axial direction of the machining tool in the automatic tool changer. Thus when exchanging a tool, there is a small region of interference with nearby parts, and the region of interference with the nearby parts remains the same regardless of the length of the machining tool in the axial direction thereof. This makes the design process easy.

Additionally, even if, for example, a chip conveyer, a cuttings box, and the like for removing cuttings produced during machining are provided on a rear side of the gear manufacturing machine, the tool holding means that holds the machining tool in the automatic tool changer is rotated, and thus the tool holding means can be caused to face in a direction in which the chip conveyer, the cuttings box, and the like do not interfere with operations. This makes it possible to carry out operations for loading and unloading the machining tool in and from the tool holding means with ease.

According to the gear manufacturing machine of the second invention, the tool holding means can be raised and lowered in accordance with a worker's height or the like, and thus a burden on the worker during operations for loading and unloading the machining tool in and from the tool holding means can be lightened.

According to the gear manufacturing machine of the third invention, the positioning means for positioning the machining tool in the circumferential direction makes it possible for the tool holding means to hold the machining tool in a predetermined phase, and thus the machining tool can be mounted on the tool spindle in a predetermined phase when exchanging the tool.

According to the gear manufacturing machine of the fourth invention, whether or not the tool holding means is holding the machining tool can be detected by the tool presence detecting means, and thus wasteful operations for mounting the machining tool on the tool spindle despite the tool holding means not holding the machining tool will not be carried out. Additionally, operations in which there is a risk of interference occurring in the position of the machining tool held by the tool holding means because the machining tool is removed from the tool spindle, will not be carried out. In other words, it is possible to eliminate problems in the operations for exchanging the tool performed by the automatic tool changer.

According to the gear manufacturing machine of the fifth invention, the tool holding means is rotated around the vertical rotation axis, and thus even when exchanging a machining tool that has been lengthened or the like in order to extend the lifespan of the tool and is thus heavy, the load of the machining tool does not act in the rotational direction. This makes it possible to rotate the tool holding means with ease.

According to the gear manufacturing machine of the sixth invention, the operations for exchanging the machining tool are carried out while keeping the axial direction of the machining tool to be exchanged, which is held by the tool holding means, and the axial direction of the tool spindle parallel with each other. Accordingly, wasteful movement of the column, the saddle, and the tool head can be eliminated, and the time required for the exchanging operations can be shortened.

According to the gear manufacturing machine of the seventh invention, the cover member that defines the spaces, the first door part, and the second door part are included. Accordingly, when loading and unloading the machining tool in and from the tool holding means of the automatic tool changer in the setup space, the safety of the gear manufacturing machine can be ensured without interfering with the machining of the gear to be machined or the like being carried out in the machining space. Additionally, by including the open/closed state detecting means, the operations of the gear manufacturing machine can be continued even when one of the first door part or the second door part is closed, for example. In other words, the machining of the gear to be machined or the like can be carried out in the machining space while ensuring the safety of the gear manufacturing machine, which makes it possible to improve the operating rate of the gear manufacturing machine.

DESCRIPTION OF EMBODIMENT

An embodiment of a gear manufacturing machine according to the present invention will be described in detail hereinafter with reference to the appended drawings. Of course, it goes without saying that the present invention is not limited to the embodiment described below, and that many changes can be made without departing from the essential spirit of the present invention.

First Embodiment

The structure of the gear manufacturing machine according to the first embodiment of the present invention will be described with reference to FIGS. 1 to 7.

Figure 1:
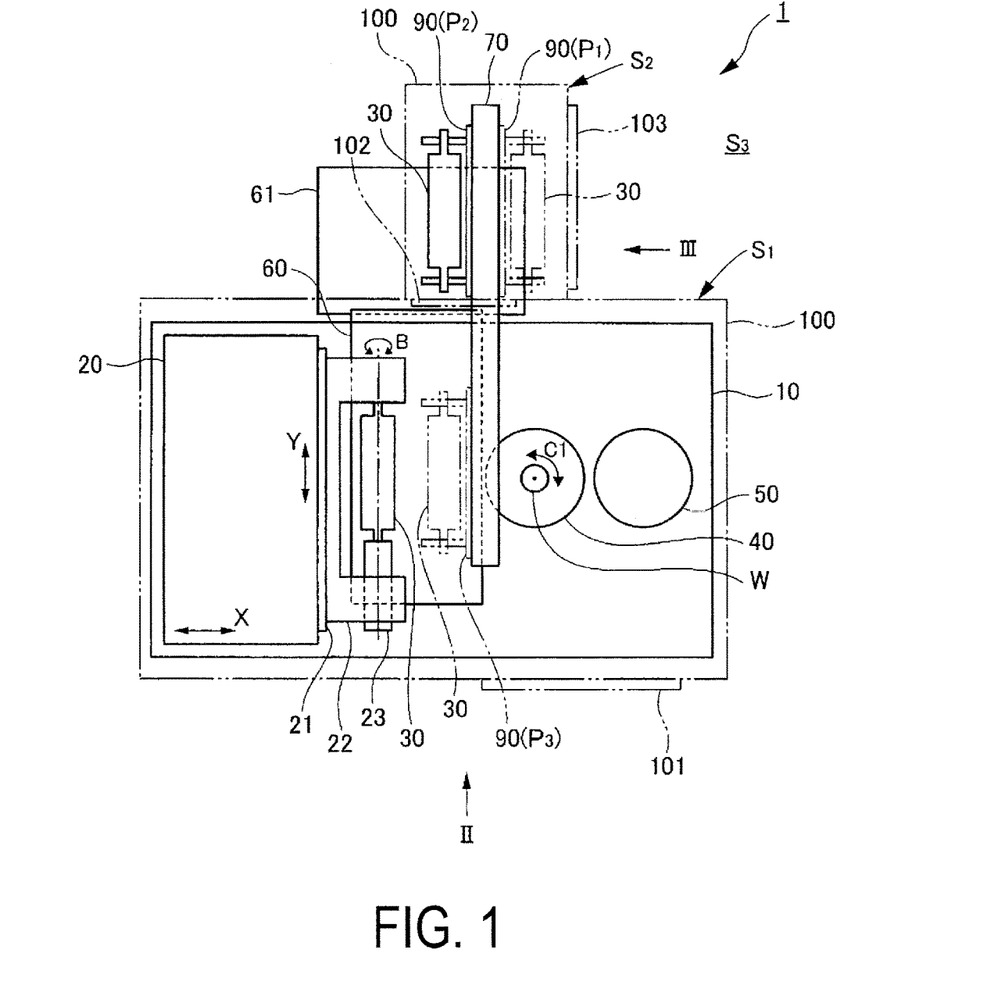
FIG. 1 is a plan view illustrating the configuration of a gear manufacturing machine according to a first embodiment.
Figure 2:
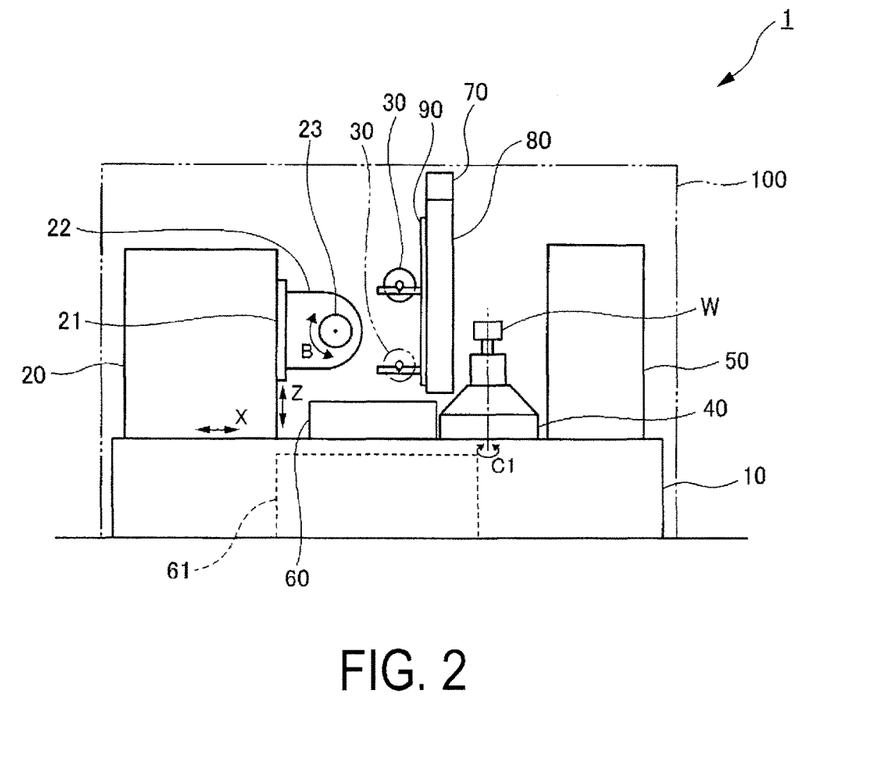
FIG. 2 is a side view (a side view seen from an arrow II-II in FIG. 1) illustrating the configuration of the gear manufacturing machine according to the first embodiment.

As illustrated in FIGS. 1 and 2, a bed 10 is provided in a hobbing machine 1, which is a gear manufacturing machine (a machine tool), and a column 20 is supported on the bed 10 so as to be movable in a horizontal X-axis direction. A saddle 21 is supported by the column 20 so as to be capable of being raised and lowered in a vertical Z-axis direction, and a hob head 22 is supported by the saddle 21 so as to be movable in a Y-axis direction orthogonal to the X-axis direction and the Z-axis direction. A hob support 23 is supported by the hob head 22 so as to be movable in a direction parallel to the Y axis, and a hob cutter 30, which is a gear machining tool (machining tool), is mounted by the hob head 22 and the hob support 23 so as to be removable and capable of rotating around a horizontal hob rotation axis B.

Accordingly, the hob cutter 30 can be moved in the X-axis direction, the Y-axis direction, and the Z-axis direction, or in other words, in three different axial directions, by driving the column 20, the saddle 21, and the hob head 22. Furthermore, the hob cutter 30 can be rotated around the hob rotation axis B by the hob head 22 rotating a hob spindle (not illustrated).

As illustrated in FIGS. 1 and 2, a table 40 is provided on the bed 10 so as to oppose the hob cutter 30 on the column 20, and a counter-column 50 is provided on the side opposite from the column 20 with the table 40 located therebetween. A rotation shaft for machining a workpiece (not illustrated) is supported on the table 40 so as to be capable of rotating around a vertical workpiece rotation axis C1, and a workpiece W, which is a machined outer gear (a machined item), can be rotatably attached to the table 40.

The workpiece W is transported, and is furthermore loaded in and unloaded from a machining position, by a workpiece changer (not illustrated) provided on the counter-column 50. The workpiece W attached to the table 40 is rotated by the rotation shaft for machining a workpiece (not illustrated) being rotationally driven, and a gear is cut into the workpiece W by the hob cutter 30 as a result.

A chip conveyer 60 is provided below the hob cutter 30 and the workpiece W located at the machining position. The chip conveyer 60 is a unit for removing cuttings produced when the workpiece W is machined, and is laid so as to extend from below the hob cutter 30 and the workpiece W located at the machining position, to a rear side of the bed 10 (an upper side in FIG. 1). Furthermore, a cuttings box 61 is provided on the rear side of the bed 10, such that a rear end side of the chip conveyer 60 is located above the cuttings box 61.

Accordingly, cuttings produced when a gear is cut into the workpiece W located at the machining position fall onto the chip conveyer 60 located therebelow, are transported to the rear side of the bed 10 by the transport operation of the chip conveyer 60, and then fall into the cuttings box 61 provided near the rear end side of the chip conveyer 60, thus removing the cuttings from the hobbing machine 1.

A transport rail 70 for transporting the hob cutter 30, a hanging implement 80 supported so as to be movable along the transport rail 70, and a tool holder 90 that is connected to the hanging implement 80 and holds the hob cutter 30 are provided in the hobbing machine 1, and the hob cutter 30 is exchanged automatically.

The transport rail 70 extends from the vicinity of the table 40 toward the rear side of the hobbing machine 1, in a direction parallel to the tool rotation axis B of the hob cutter 30 (the up-down direction in FIG. 1), and the hanging implement 80 is connected to the transport rail 70 by a movement mechanism (not illustrated). Accordingly, when a driving source (not illustrated) is driven, the hanging implement 80 can be moved from one end to the other end of the transport rail 70, or in other words, from the vicinity of the table 40 to the rear of the bed 10. In other words, in the hobbing machine 1 according to the present embodiment, the transport rail 70 and the hanging implement 80 constitute moving means for moving the tool holder 90 in a direction parallel to the axial direction of the hob spindle (not illustrated).

Figure 3:
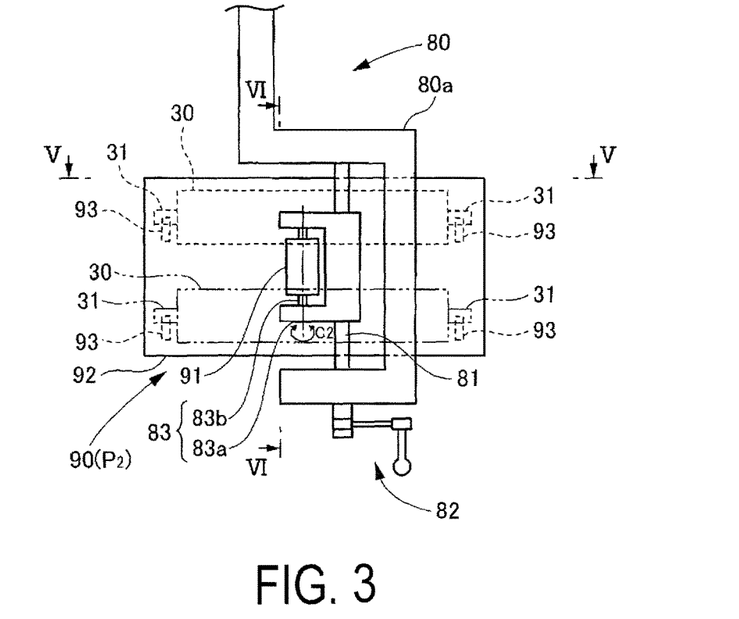
FIG. 3 is an explanatory diagram (a side view seen from an arrow III-III in FIG. 1) illustrating a tool holder in the gear manufacturing machine according to the first embodiment.
Figure 4:
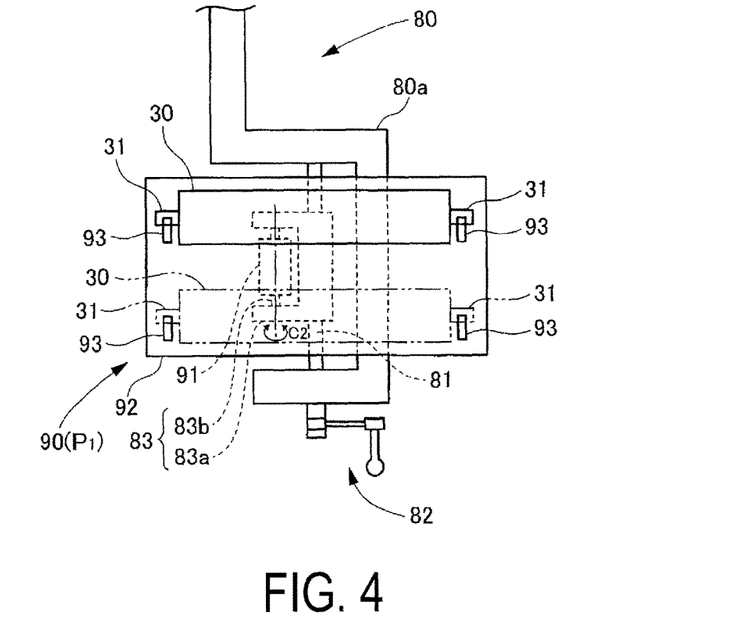
FIG. 4 is an explanatory diagram illustrating the tool holder in the gear manufacturing machine according to the first embodiment.

As illustrated in FIGS. 3 and 4, a rod-shaped screw member 81 extending in the vertical direction is provided in a bracket-shaped portion 80a located on a lower end side of the hanging implement 80, and a handle 82 is connected to a lower end side of the screw member 81. Additionally, a holder holding member 83 for holding the tool holder 90 is provided by being screwed onto the screw member 81. A worker rotates the screw member 81 by manipulating the handle 82, and the rotation of the screw member 81 causes the holder holding member 83 to move in the axial direction of the screw member 81, or in other words, in a vertical direction (the up-down direction in FIGS. 3 and 4) (that is, raises and lowers the holder holding member 83). In other words, in the hobbing machine 1 according to the present embodiment, the screw member 81, the handle 82, and the holder holding member 83 constitute raising and lowering means for raising and lowering the tool holder 90 in the vertical direction.

A main portion 83a that is screwed onto the screw member 81 and is capable of rising and falling, and a connecting rod 83b that is connected to the main portion 83a and rotatably supports the tool holder 90, are provided in the holder holding member 83.

As illustrated in FIGS. 3 to 6, a support part 91 rotatably supported by the connecting rod 83b of the holder holding member 83, a flat plate-shaped main part 92 connected to the support part 91, and claw parts 93 that project in a direction opposite from the side where the main part 92 is connected to the support part 91 and on which the hob cutter 30 is placed, are provided in the tool holder 90.

Accordingly, the tool holder 90 can move along the transport rail 70 with the hanging implement 80 (see FIG. 1), and can rotate around a holder rotation axis C2 that is vertical relative to the hanging implement 80 (see FIGS. 3 to 6). Thus by being rotated around the holder rotation axis C2, the tool holder 90 can move between a tool loading/unloading position P1 and a standby position P2. Furthermore, by the hanging implement 80 moving along the transport rail 70, the tool holder 90 can move between the standby position P2 and a tool exchanging position P3. In other words, in the hobbing machine 1 according to the present embodiment, the holder holding member 83 and the support part 91 constitute rotating means for rotating the tool holder 90 around the vertical holder rotation axis C2.

The tool loading/unloading position P1 is a position of the tool holder 90 when the worker loads and unloads the hob cutter 30 in and from the hobbing machine 1. The standby position P2 is a position of the tool holder 90 when the hanging implement 80 and the tool holder 90 stand by during machining operations of the hobbing machine 1. The tool exchanging position P3 is a position of the tool holder 90 when, after machining is complete, the hanging implement 80 and the tool holder 90 move to the vicinity of the column 20 and the tool is exchanged.

Note that rotation locking mechanisms (not illustrated) that prevent the hanging implement 80 and the tool holder 90 from rotating around the holder rotation axis C2 are provided in the hanging implement 80 and the tool holder 90. The tool holder 90 is fixed in the tool loading/unloading position P1 or the standby position P2 in a state where the tool holder 90 is prevented from rotating around the holder rotation axis C2 by the rotation locking mechanism, and can move between the tool loading/unloading position P1 and the standby position P2 in a state where the tool holder 90 is not prevented from rotating around the holder rotation axis C2 by the rotation locking mechanism.

Figure 5:
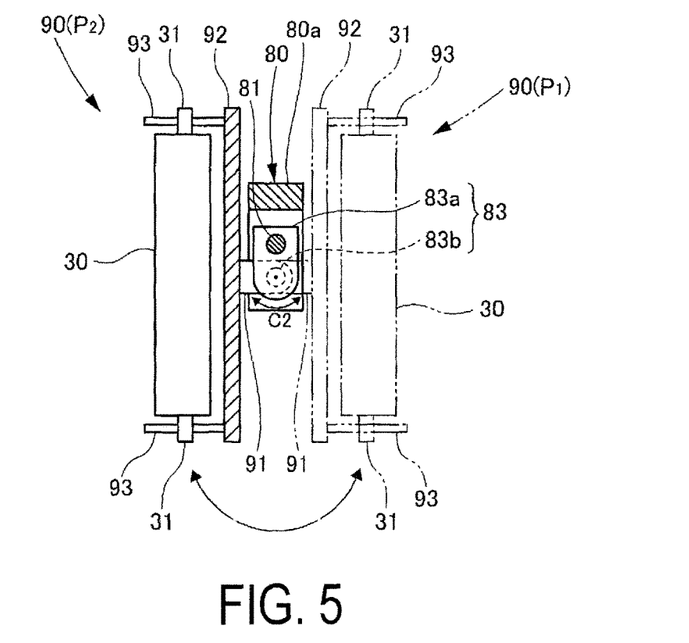
FIG. 5 is an explanatory diagram (a cross-sectional view seen from a V-V line in FIG. 3) illustrating the tool holder in the gear manufacturing machine according to the first embodiment.
Figure 6:
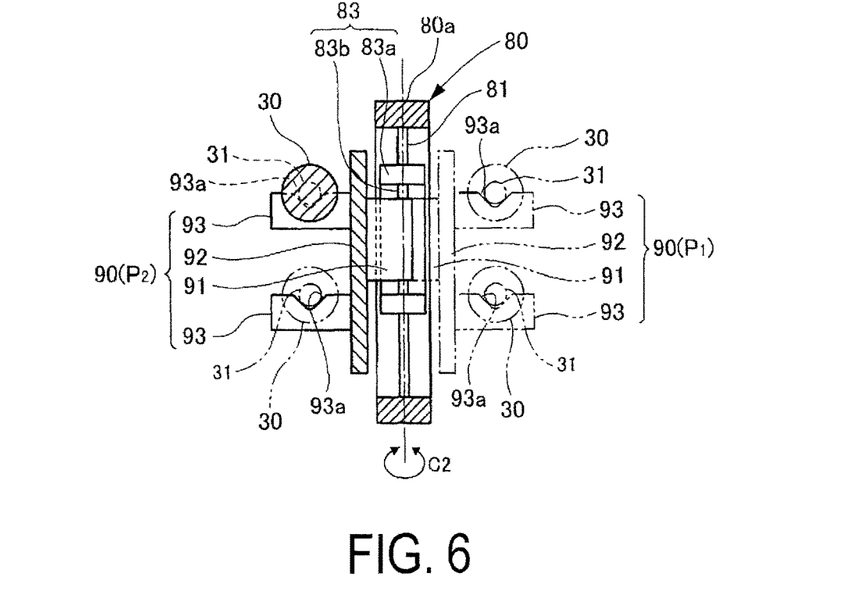
FIG. 6 is an explanatory diagram (a cross-sectional view seen from a VI-VI line in FIG. 3) illustrating the tool holder in the gear manufacturing machine according to the first embodiment.

As illustrated in FIGS. 3 to 5, the claw parts 93 of the tool holder 90 are provided as a pair on the left and right (the left and right in FIGS. 3 and 4 and the top and bottom in FIG. 5) so as to correspond to clamp parts 31 provided on both ends of the hob cutter 30. Furthermore, as illustrated in FIGS. 3, 4, and 6, sets of the claw parts 93 are respectively provided on an upper side (an upper stage) and a lower side (a lower stage) of the main part 92, separated by a predetermined distance in the vertical direction (the up-down direction in FIGS. 3, 4, and 6), so that multiple (two, in the present embodiment) hob cutters 30 can be placed thereon.

Thus, the tool holder 90 can hold at least two hob cutters 30, which makes it possible to both collect a used hob cutter 30 and mount a new hob cutter 30 in a single round-trip pass of the hanging implement 80 along the transport rail 70. Meanwhile, in the case where the tool holder 90 can hold at least three hob cutters 30, multiple hob cutters 30, for use in the next step to several steps therebeyond, can be placed in the tool holder 90 in a single tool exchanging setup operation. In other words, movement of the hanging implement 80 and the tool holder 90 for exchanging tools, the number of tool exchanging setup operations, and the like can be reduced, which in turn makes it possible to reduce the workload for exchanging tools in the hobbing machine 1.

A cutout portion 93a is provided in each claw part 93, corresponding to the clamp parts 31 of the hob cutter 30, and thus the hob cutter 30 can be placed in a stable manner. A key seat 93b is provided in each cutout portion 93a, and a key 94 is attached to the key seat 93b. In other words, by placing the hob cutter 30 so that key seats 32 formed in the clamp parts 31 of the hob cutter 30 fit with the keys 94 attached to the claw parts 93, the hob cutter 30 can be placed in a predetermined phase and position. Thus when mounting a hob cutter 30 placed on the claw parts 93 using the hob head 22 and the hob support 23, the hob cutter 30 can be mounted on the hob spindle (not illustrated) in a predetermined phase and position. In other words, in the hobbing machine 1 according to the present embodiment, the cutout portions 93a of the claw parts 93 and the keys 94 in the tool holder 90, and the key seats 32 of the clamp parts 31 in the hob cutter 30, constitute positioning means for aligning circumferential direction phases and axial direction positions of the hob spindle (not illustrated) and the hob cutter 30.

Additionally, in each claw part 93, a pendulum member 95 is supported by a pin 96 so as to be capable of pivoting, and a proximity sensor 97 is furthermore provided in the vicinity of the pendulum member 95. When the hob cutter 30 is placed on the claw part 93, an end surface (contact surface) 95a on one end of the pendulum member 95 (a left side, in FIG. 7) makes contact with the clamp part 31 of the hob cutter 30, and the contact between the clamp part 31 and the contact surface 95a causes the pendulum member 95 to pivot central to the pin 96 (pivot counter-clockwise, in FIG. 7).

When the hob cutter 30 is not placed on the claw part 93, other end of the pendulum member 95 (a right side, in FIG. 7) is in a lowered state (the long dashed double-short dashed line indicated in FIG. 7), with an end surface 95b on the other end distanced from the proximity sensor 97. As a result, the pendulum member 95 is not detected by the proximity sensor 97, or in other words, it is determined that the hob cutter 30 is not placed on the claw part 93.

On the other hand, when the hob cutter 30 is placed on the claw part 93, the clamp part 31 makes contact with the contact surface 95a and the other end of the pendulum member 95 rises (indicated by the solid line in FIG. 7), bringing the end surface 95b on the other end close to the proximity sensor 97. As a result, the pendulum member 95 is detected by the proximity sensor 97, or in other words, it is determined that the hob cutter 30 is placed on the claw part 93.

Figure 7:
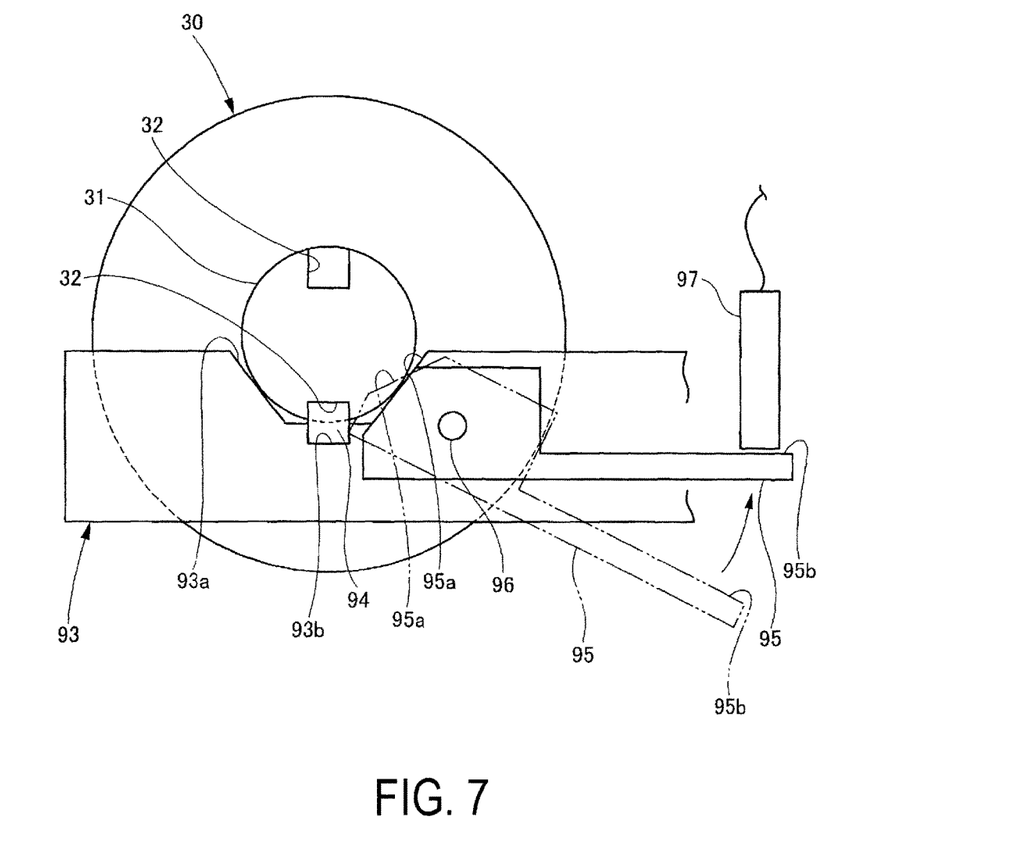
FIG. 7 is an explanatory diagram illustrating a state in which a hob cutter is placed in the tool holder in the gear manufacturing machine according to the first embodiment.

In this manner, whether or not the hob cutter 30 is placed on the claw part 93, or in other words, whether or not the hob cutter 30 is present, is detected on the basis of whether the end surface 95b on the other end of the pendulum member 95 is close to or distanced from the proximity sensor 97. In other words, in the present embodiment, the pendulum member 95, the pin 96, and the proximity sensor 97 constitute tool presence detecting means.

In the hobbing machine 1 according to the present embodiment, the transport rail 70, the hanging implement 80, and the tool holder 90 configured as described above constitute an automatic tool changer.

A cover member 100 formed from metal plates or the like is provided in the hobbing machine 1, and the cover member 100 defines a machining space S1 where the workpiece W is machined, a tool exchanging setup space S2 where setup operations for exchanging the hob cutter 30 are carried out, and an operation space S3 (a space surrounding the hobbing machine 1) where a worker such as an operator carries out maintenance or the like. Additionally, retractable shutters (retractable parts) 101, 102, and 103 are provided in the cover member 100, so that the worker, the hob cutter 30, or the like can travel among the spaces S1, S2, and S3.

A first shutter 101 enables the operation space S3 and the machining space S1 to communicate so that a worker such as an operator can perform maintenance and the like on the hobbing machine 1. A second shutter 102 enables the machining space S1 and the tool exchanging setup space S2 to communicate so that the hanging implement 80 and the tool holder 90 can move along the transport rail 70. A third shutter 103 enables the operation space S3 and the tool exchanging setup space S2 to communicate so that setup operations for exchanging the hob cutter 30 can be carried out, or in other words, so that the hob cutter 30 can be loaded in or unloaded from the tool holder 90 located in the tool exchanging position P1.

Figure 11:
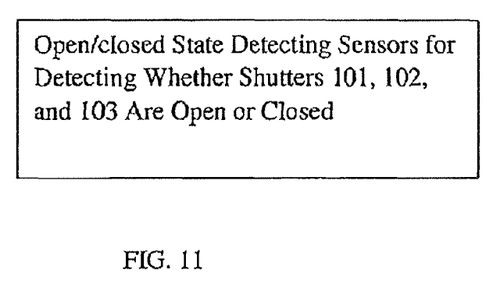
FIG. 11 schematically depicts an aspect of the first embodiment.

As a gear manufacturing machine, it is necessary to provide a level of safety, and thus the hobbing machine 1 includes sensors (schematically illustrated in FIG. 11) that detect whether the shutters 101, 102, and 103 are open or closed. This ensures that gear machining operations and the like of the hobbing machine 1 are not started or are stopped in the case where the machining space S1 and the operation space S3 communicate, or in other words, in the case where the first shutter 101 is open, or in the case where the second shutter 102 or the third shutter 103 is open. Safety is ensured when the first shutter 101 and the second shutter 102 are closed, and thus in this case, the third shutter 103 can be opened.

Operations for exchanging the hob cutter 30 in the hobbing machine 1 according to the present embodiment will be described with reference to FIGS. 8 to 10.

First, while a gear is being cut into a workpiece W by a hob cutter 30, a hob cutter 30 to be used for a new machining process is loaded in the automatic tool changer. The operation for loading the new hob cutter 30 is carried out while the gear is being cut into the workpiece W by the hob cutter 30 and the automatic tool changer is not operating.

The third shutter 103 is opened, the rotation locking mechanism (not illustrated) is released, and the tool holder 90 in the standby position P2 is rotated (reversed); then, using the rotation locking mechanism, the tool holder 90 is prevented from rotating and is fixed in the tool loading/unloading position P1. The first shutter 101 and the second shutter 102 are closed at this time, and thus even if the third shutter 103 is opened, the machining space S1 is separated from the tool exchanging setup space S2 and the operation space S3. Accordingly, the gear machining operations performed by the hobbing machine 1 are not stopped by the third shutter 103 being opened.

Next, the height of the tool holder 90, or in other words, of the claw parts 93 on which the hob cutter 30 is placed, is adjusted by manipulating the handle 82 of the hanging implement 80. The new hob cutter 30 is placed on one set of the claw parts 93 (in the present embodiment, on the upper side in FIGS. 3, 4, and 6) of the tool holder 90. At this time, the hob cutter 30 is placed so that the key seats 32 provided therein fit with the keys 94 provided in the claw parts 93. Thus when the hob cutter 30 is placed on the claw parts 93 of the tool holder 90, the circumferential direction phase and axial direction position of the hob cutter 30 are aligned as a result of the keys 94 fitting into the key seats 32. This makes it possible to mount the hob cutter 30 on the hob spindle (not illustrated) with the hob head 22 and the hob support 23 in the correct phase and the correct position when exchanging the tool.

However, nothing is placed on the other set of claw parts 93 (in the present embodiment, on the lower side in FIGS. 3, 4 and 6). Not placing anything on the other set of claw parts 93 and leaving those claw parts 93 open in this manner makes it possible, when exchanging the tool, to remove the used hob cutter 30 from the hob spindle (not illustrated) and place that hob cutter 30 on this other set of claw parts 93 of the tool holder 90.

Next, the rotation locking mechanism (not illustrated) is again released, the tool holder 90 is rotated (reversed), and then, using the rotation locking mechanism, the tool holder 90 is prevented from rotating and is fixed in the standby position P2. The third shutter 103 is closed and the operation for loading a new hob cutter 30 in the automatic tool changer ends.

In the hobbing machine 1 according to the present embodiment, the tool holder 90 is rotated 180° around the holder rotation axis C2 from the standby position P2 on the rear side of the bed 10, and thus the chip conveyer 60 and the cuttings box 61, which are also provided on the rear side of the bed 10, do not interfere with the above-described operation for loading the hob cutter 30. The operation for loading a new hob cutter 30 in the automatic tool changer can thus be carried out with ease.

Once the process of the hob cutter 30 cutting a gear in the workpiece W is finished and the rotation of the hob spindle (not illustrated) is stopped, the automatic tool changer is driven and the hob cutter 30 is exchanged. The second shutter 102 is opened, and the hanging implement 80 and the tool holder 90 move along the transport rail 70 to the front side of the hobbing machine 1, or in other words, to the machining space S1. The first shutter 101 and the third shutter 103 are closed at this time, and thus the machining space S1 is separated from the operation space S3 even if the second shutter 102 is opened. Accordingly, the transport operations and the like of the hobbing machine 1 carried out in the machining space S1 are not stopped by the second shutter 102 being opened. Additionally, even if the second shutter 102 is opened immediately before the process of the hob cutter 30 cutting a gear in the workpiece W ends, that process will not be stopped by the second shutter 102 being opened. Accordingly, the second shutter 102 can be opened and preparations can be made for the tool exchanging operations by the automatic tool changer.

Upon the tool holder 90 reaching the tool exchanging position P3, operations for exchanging the hob cutter 30 are carried out. The column 20 and the saddle 21 are driven, bringing the hob head 22 and the hob support 23 toward the tool holder 90 (see FIG. 8). The hob cutter 30 mounted in the hob head 22 and the hob support 23 is brought close to the other (lower) set of claw parts 93 of the tool holder 90, on which nothing is placed. At this time, it is confirmed that the hob cutter 30 is not placed on the other set of claw parts 93 using the proximity sensors 97 in the other set of claw parts 93.

Figure 9:
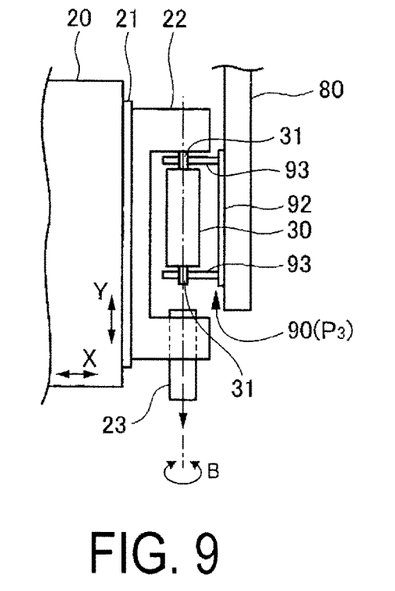
FIG. 9 is an explanatory diagram illustrating tool exchanging operations of the gear manufacturing machine according to the first embodiment.
Figure 10:
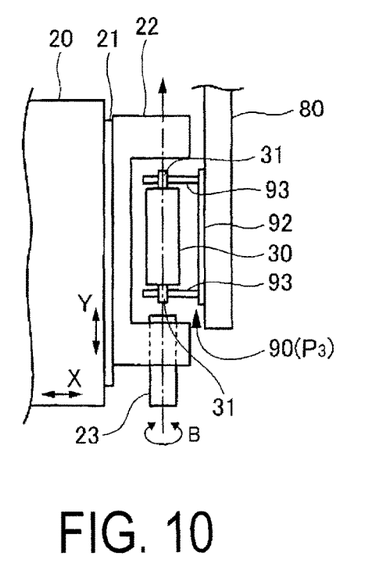
FIG. 10 is an explanatory diagram illustrating tool exchanging operations of the gear manufacturing machine according to the first embodiment.

One end of the hob cutter 30 (the lower end side in FIG. 9) is removed by driving the hob support 23 (see FIG. 9), and other end of the hob cutter 30 (the upper end side in FIG. 10) is removed by driving the hob head 22 (see FIG. 10). The hob cutter 30 is removed from the hob head 22 and the hob support 23 and is placed on the other (lower) set of claw parts 93 of the tool holder 90 as a result of this operation.

Next, by driving the saddle 21, the hob head 22 and the hob support 23 are brought toward the one (upper) set of claw parts 93 of the tool holder 90, on which the new hob cutter 30 has been placed. At this time, there is sufficient space between the hob head 22 and the hob support 23, which eliminates interference with the used hob cutter 30 placed on the other set of claw parts 93 and the unused hob cutter 30 placed on the one set of claw parts 93 (see FIG. 10). Additionally, it is confirmed that a hob cutter 30 is placed on the one set of claw parts 93 using the proximity sensors 97 in the one set of claw parts 93.

Figure 8:
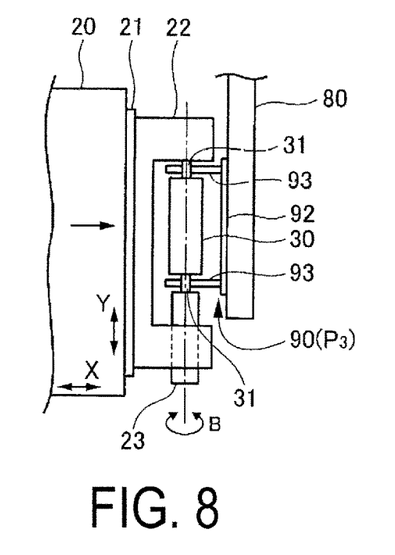
FIG. 8 is an explanatory diagram illustrating tool exchanging operations of the gear manufacturing machine according to the first embodiment.

One end of the hob cutter 30 is gripped by driving the hob head 22 (see FIG. 9), and the other end of the hob cutter 30 is gripped by driving the hob support 23 (see FIG. 8). The hob cutter 30 is mounted in the hob head 22 and the hob support 23 as a result of this operation. In other words, in the hobbing machine 1 according to the present embodiment, the driving of the column 20, the saddle 21, and the hob head 22 causes the hob cutter 30 held by the tool holder 90 to be mounted on the hob spindle with the hob cutter 30 held by the tool holder 90 and the axial direction of the hob spindle (not illustrated) kept parallel to each other.

At this time, as described above, the keys 94 attached to the claw parts 93 fit with the key seats 32 of the hob cutter 30, and as a result, the circumferential direction phase and the axial direction position of the hob cutter 30 are aligned with the claw parts 93 of the tool holder 90. Accordingly, the hob head 22 and the hob support 23 can mount the hob cutter 30 in the correct phase and the correct position.

Next, the hob head 22 and the hob support 23 are separated from the tool holder 90 by driving the column 20 and the saddle 21, and the hanging implement 80 and the tool holder 90 move along the transport rail 70 to the rear side of the hobbing machine 1, or in other words, to the tool exchanging setup space S2. Upon the tool holder 90 reaching the standby position P2, the second shutter 102 is closed, and the process of cutting a gear into the workpiece W using the newly-mounted hob cutter 30 is carried out in the machining space S1.

Finally, the used hob cutter 30 is unloaded from the automatic tool changer. The operation for unloading the used hob cutter 30 is carried out after the operations for exchanging the hob cutter 30 performed by the automatic tool changer have ended and while the automatic tool changer is not operating.

The third shutter 103 is opened, the rotation locking mechanism (not illustrated) is released, and the tool holder 90 is rotated (reversed); then, using the rotation locking mechanism, the tool holder 90 is prevented from rotating and is fixed in the tool loading/unloading position P1. The first shutter 101 and the second shutter 102 are closed at this time, and thus even if the third shutter 103 is opened, the machining space S1 is separated from the tool exchanging setup space S2 and the operation space S3. Accordingly, the gear machining operations performed by the hobbing machine 1 are not stopped by the third shutter 103 being opened.

Next, the height of the tool holder 90, or in other words, of the claw parts 93 on which the hob cutter 30 is placed, is adjusted by manipulating the handle 82 of the hanging implement 80. The used hob cutter 30 is removed from the other set of claw parts 93 (in the present embodiment, the set on the lower side in FIGS. 3, 4, and 6) of the tool holder 90.

The rotation locking mechanism (not illustrated) is again released, the tool holder 90 is rotated (reversed), and then, using the rotation locking mechanism, the tool holder 90 is prevented from rotating and is fixed in the standby position P2. The third shutter 103 is closed and the operation for unloading the used hob cutter 30 from the automatic tool changer ends.

In the hobbing machine 1 according to the present embodiment, the tool holder 90 is rotated 180° around the holder rotation axis C2 from the standby position P2 on the rear side of the bed 10. Accordingly, like the operations for loading the hob cutter 30 described above, the chip conveyer 60 and the cuttings box 61, which are also provided on the rear side of the bed 10, do not interfere with the above-described operations for unloading the hob cutter 30. The operations for unloading the used hob cutter 30 from the automatic tool changer can thus be carried out with ease.

Of course, when the above-described unloading operations are carried out, the hob cutter 30 to be used in the next process may be placed on the claw parts 93 of the tool holder 90 and the above-described loading operations may be carried out.

According to the hobbing machine 1 of the present embodiment, the hob cutter 30, which is the machining tool, is moved in the axial direction of the hob cutter 30 in the automatic tool changer. Thus when exchanging a tool, there is a small region of interference with nearby parts and the like, and the region of interference with the nearby parts remains the same regardless of the length of the hob cutter 30 in the axial direction thereof. This makes the design process easy.

Additionally, because the tool holder 90 that holds the hob cutter 30 in the automatic tool changer is rotated, the chip conveyer 60 and the cuttings box 61 provided on the rear side of the hobbing machine 1 do not interfere with the operations for loading and unloading hob cutters 30 in and from the tool holder 90, and thus those operations can be carried out with ease.

REFERENCE SIGNS LIST

1 Hobbing machine (machine tool; gear manufacturing machine)
10 Bed
20 Column
21 Saddle
22 Hob head (tool head)
23 Hob support
30 Hob cutter (machining tool)
31 Clamp part of hob cutter
32 Key seat of hob cutter (phase aligning means)
40 Table (rotary table)
50 Counter-column
60 Chip conveyer
61 Cuttings box
70 Transport rail (moving means)
80 Hanging implement (moving means)
80a Bracket-shaped portion of hanging implement
81 Screw member of hanging implement (raising and lowering means)
82 Handle of hanging implement (raising and lowering means)
83 Holder holding member of hanging implement (raising and lowering means; rotating means)
83a Main portion of holder holding member of hanging implement (raising and lowering means)
83b Connecting rod of holder holding member of hanging implement (rotating means)
90 Tool holder (tool holding means)
91 Support part of tool holder (tool holding means; rotating means)
92 Main part of tool holder (tool holding means)
93 Claw part of tool holder (tool holding means)
93a Cutout portion of claw part of tool holder (tool holding means)
93b Key seat of claw part of tool holder (phase aligning means)
94 Key of tool holder (phase aligning means)
95 Pendulum member of tool holder (tool presence detecting means)
96 Pin of tool holder (tool presence detecting means)
97 Proximity sensor (tool presence detecting means)
100 Cover member
101 First shutter (door part)
102 Second shutter (first door part)
103 Third shutter (second door part)
W Workpiece
P1 Tool loading/unloading position
P2 Standby position
P3 Tool exchanging position
S1 Machining space
S2 Tool exchanging setup space (setup space)
S3 Operation space (outside space)
B Tool rotation axis
C1 Workpiece rotation axis
C2 Holder rotation axis

The invention claimed is:

1. A gear manufacturing machine comprising an automatic tool changer that exchanges a machining tool mounted on a tool spindle in a removable state, the automatic tool changer including:
   tool holding means for holding the machining tool in a removable state;
   moving means for moving, in a direction parallel to a rotation axis of the tool spindle, the tool holding means between (i) a tool exchanging position for exchanging the machining tool, and (ii) a standby position in which the machining tool stands by during machining operations; and
   rotating means for rotating the tool holding means between the standby position and a tool loading/unloading position for loading and unloading the machining tool to and from the gear manufacturing machine, respectively.

2. The gear manufacturing machine according to claim 1, wherein the automatic tool changer includes raising and lowering means for raising and lowering the tool holding means in a vertical direction.

3. The gear manufacturing machine according to claim 1, wherein the tool holding means includes positioning means for positioning the machining tool in a circumferential direction.

4. The gear manufacturing machine according to claim 1, wherein the automatic tool changer includes tool presence detecting means for detecting whether or not the tool holding means is holding the machining tool.

5. The gear manufacturing machine according to claim 1, wherein the rotating means rotates the tool holding means around a vertical rotation axis.

6. The gear manufacturing machine according to claim 1, further comprising:
   a column supported on a bed, a saddle supported on the column, and a tool head supported on the saddle, the column, the saddle, and the tool head each being movable in a respective one of three mutually-different axial directions,
   wherein by driving the column, the saddle, and the tool head, the machining tool held by the tool holding means is mounted on the tool spindle with a longitudinal direction of the machining tool held by the tool holding means and the axial direction of the tool spindle kept parallel to each other.

7. The gear manufacturing machine according to claim 1, further comprising:
   a cover member that defines: (i) a machining space in which a gear is cut into a gear to be machined, (ii) a setup space for loading and unloading the machining tool in and from the tool holding means, and (iii) an outside space outside the machining space and the setup space;
   a first door part, provided in the cover member, that enables the machining space and the setup space to communicate;
   a second door part, provided in the cover member, that enables the setup space and the outside space to communicate; and
   open/closed state detecting means for detecting whether the first door part and the second door part are open or closed.

* * * * *